UNITED STATES PATENT OFFICE.

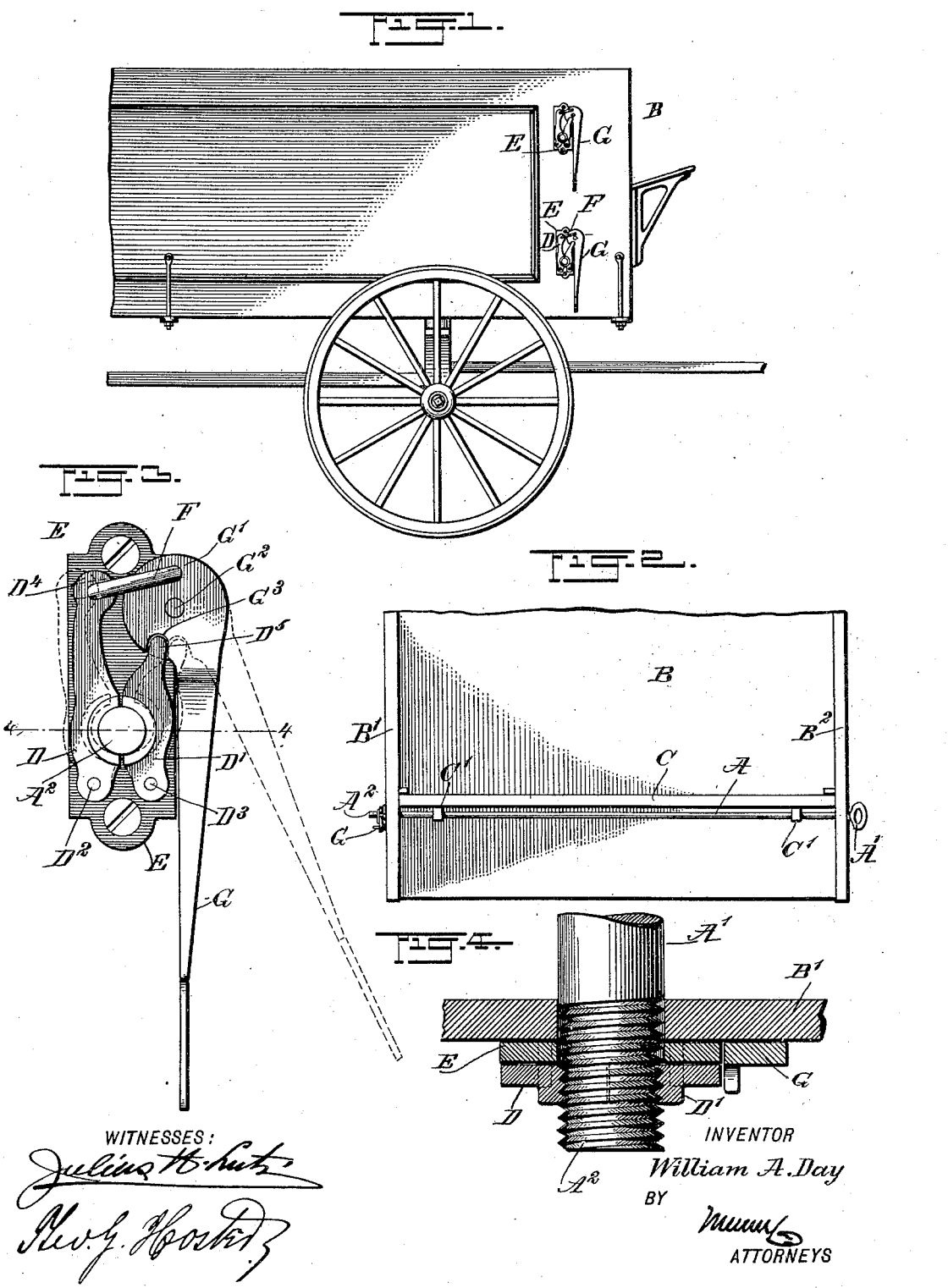

WILLIAM AUSTIN DAY, OF CLAY CENTER, NEBRASKA.

END-GATE-ROD FASTENER.

SPECIFICATION forming part of Letters Patent No. 696,899, dated April 1, 1902.

Application filed November 15, 1901. Serial No. 82,371. (No model.)

*To all whom it may concern:*

Be it known that I, WILLIAM AUSTIN DAY, a citizen of the United States, and a resident of Clay Center, in the county of Clay and State of Nebraska, have invented a new and Improved End-Gate-Rod Fastener, of which the following is a full, clear, and exact description.

The object of the invention is to provide a new and improved end-gate-rod fastener which is simple and durable in construction and arranged to securely hold and lock an end-gate rod in place and also to permit quick unlocking of the end-gate rod for removing the same whenever it is desired to do so.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement as applied. Fig. 2 is a plan view of the same. Fig. 3 is an enlarged side elevation of the improvement, and Fig. 4 is a sectional plan view of the same on the line 4 4 of Fig. 3.

A rod A engages the sides $B'$ $B^2$ of a wagon-body B and also engages lugs $C'$ of an end-gate C in the usual manner, and one end of the said rod A is formed with a head $A'$, and the other end $A^2$ is provided with screw-threads adapted to be engaged by a sectional nut consisting of the sections D and $D'$, fulcrumed at $D^2$ and $D^3$ on a plate E, fastened to the outside of the side $B'$ of the wagon-body, as plainly shown in the drawings. The free end $D^4$ of the nut-section D is connected by a link F with the fulcrum end $G'$ of a lever G under the control of the operator and fulcrumed at $G^2$ on the plate E. The free end $D^5$ of the other nut-section $D'$ is adapted to engage a recess $G^3$, formed on the fulcrum end of the lever G, and the said recess is located approximately diametrically opposite the connection between the link F and the fulcrum end of the lever G. (See Fig. 3.) When the nut is closed, as shown in the drawings, the rod A can be screwed up in the nut to securely hold and lock the end-gate C in place and prevent the sides $B'$ and $B^2$ of the wagon-body from spreading apart. When it is desired to remove the end-gate, it is only necessary for the operator to swing the lever G outward into the position shown in dotted lines in Fig. 3, so that the nut-sections D and $D'$ are caused to swing open—that is, out of engagement with the threads on the end $A^2$ of the rod A—and the latter can now be pulled out of position by the operator taking hold of the head $A'$ and pulling the same in an outward and transverse direction. When the rod A is removed from the sides and the end-gate, the latter can be removed from the wagon-bed. It will be seen that when the lever G is in the closed position illustrated in the drawings the nut-sections D and $D'$ are closed to allow of screwing the rod A up in the nut for the purpose previously mentioned, and by having the nut-sections connected in the manner described with the lever G the several parts are not liable to swing out of position, and hence the nut is securely locked during the time the threaded end $A^2$ of the bolt is screwed up in the nut.

Having thus described my invention, I claim as new and desire to secure by Letters Patent—

1. An end-gate-rod fastener, comprising a rod for engagement with an end-gate and the sides of a wagon-body, a sectional nut forming a permanent fixture of one side of the wagon-body, the threaded end of the rod being engaged by the said sectional nut, and a lever device for the said nut, to open the sections thereof and thereby disengage the nut from the threads of the rod, as set forth.

2. An end-gate-rod fastener, comprising a rod for engagement with an end-gate and the sides of a wagon-body, a nut for engaging the threaded end of the rod and formed of pivoted nut-sections, and a lever connected with the free ends of the said nut-sections to simultaneously open or close the nut-sections, as set forth.

3. An end-gate-rod fastener, comprising a rod for engagement with an end-gate and the sides of a wagon-body, a nut for engaging the threaded end of the rod, the nut being formed of sections pivoted on the sides of the wagon-body, a lever having a recess at its fulcrum end to engage the free end of one of the nut-sections, and a link connecting the free end of the other nut-section with the fulcrum end of the lever, as set forth.

In testimony whereof I have signed my name to this specification in the presence of two subscribing witnesses.

WILLIAM AUSTIN DAY.

Witnesses:
G. W. NAGEL,
JOHN H. NAGEL.